(12) United States Patent
Tolli (10) Patent No.: US 11,306,703 B2
(45) Date of Patent: Apr. 19, 2022

(54) WIND TURBINE DRIVE TRAIN

(71) Applicant: William Tolli, Plainville, CT (US)

(72) Inventor: William Tolli, Plainville, CT (US)

( * ) Notice: Subject to any disclaimer, the term of this patent is extended or adjusted under 35 U.S.C. 154(b) by 78 days.

(21) Appl. No.: 16/864,578

(22) Filed: May 1, 2020

(65) Prior Publication Data

US 2021/0340961 A1 Nov. 4, 2021

(51) Int. Cl.
*F16H 23/10* (2006.01)
*F16H 53/02* (2006.01)
*F03D 15/00* (2016.01)
*F16H 25/14* (2006.01)

(52) U.S. Cl.
CPC .............. *F03D 15/00* (2016.05); *F16H 23/10* (2013.01); *F16H 25/14* (2013.01); *F16H 53/02* (2013.01)

(58) Field of Classification Search
CPC .......... F03D 15/00; F03D 15/20; F03D 80/88; F16H 23/10; F16H 25/02; F16H 25/14; F16H 53/02
See application file for complete search history.

(56) References Cited

U.S. PATENT DOCUMENTS

| 1,503,526 | A | * | 8/1924 | Dulak | F03D 15/00 |
| | | | | | 74/381 |
| 7,911,076 | B2 | | 3/2011 | Stephens et al. | |
| 8,358,024 | B2 | | 1/2013 | Tsutsumi et al. | |
| 8,482,147 | B2 | * | 7/2013 | Moser | F03D 15/00 |
| | | | | | 290/55 |
| 8,517,669 | B2 | * | 8/2013 | Dotts, III | F03D 15/00 |
| | | | | | 415/122.1 |
| 8,922,047 | B2 | | 12/2014 | Yoon | |
| 9,410,534 | B2 | * | 8/2016 | Grieve | F03D 9/25 |
| 11,009,010 | B1 | * | 5/2021 | Saavedra | F03D 9/32 |
| 2013/0168968 | A1 | * | 7/2013 | Dong | F03D 15/10 |
| | | | | | 290/55 |
| 2014/0086773 | A1 | | 3/2014 | Valentin | |

FOREIGN PATENT DOCUMENTS

| EP | 3754182 A1 * | 12/2020 | ............... F03D 9/25 |
| FR | 3089583 A1 * | 6/2020 | ............ F03B 17/061 |

OTHER PUBLICATIONS

International Search Report and Written Opinion of the International Searching Authority; Application No. PCT/US2021/029809; Completed: Jul. 6, 2021; dated Aug. 6, 2021; 6 Pages.

* cited by examiner

*Primary Examiner* — Adam D Rogers
(74) *Attorney, Agent, or Firm* — Whitmyer IP Group LLC (57) ABSTRACT

A wind turbine having a tower having a top end and a bottom end; a first eccentric mechanism connected to a turbine rotor, the turbine rotor at the top end of the tower; a second eccentric mechanism connected to an electric generator, the electric generator being at the bottom end of the tower; and a plurality of tensile links connecting the first and second eccentric mechanisms.

20 Claims, 7 Drawing Sheets

WIND TURBINE DRIVE TRAIN

TECHNICAL FIELD

The disclosure herein relates to devices for transmitting rotational energy from the input rotor shaft of a turbine to an electricity generator. Turbines are used to harvest energy from a moving fluid and convert it into other forms of energy, often electricity but alternatively kinetic or potential energy. Turbines that harvest energy from atmospheric wind do so by transmitting a rotational energy from the rotor of the turbine to an electrical generator. Rotational energy can be transmitted by direct coupling to the generator or indirectly through drivetrain components, such as gear sets or transmissions.

BACKGROUND

Some of the largest turbines on earth are wind turbines and, in order to access enough wind to operate, must be placed at the top of tall towers or structures. These structures must be slender, so as to not disrupt the flow of wind through a turbine, and strong, to endure the forces exerted by the wind on the blades of the turbine. While a tall tower improves the performance of a wind turbine, the taller the tower, the more difficult it is to place and service machinery at the top of the tower.

Commercial wind turbines produce thousands of watts (kW), if not, millions of watts (MW) of electricity. A generator large enough to produce these amounts of electricity is both large and heavy, weighing many tons. Current designs of electricity-generating wind turbines place the generator at the top of the tower, close to the rotor. The generator is so large and heavy that large and expensive cranes and crane systems are required to construct commercial wind turbines. Accordingly, a significant portion of construction costs are associated with lifting the generator to the top of a wind turbine tower. This problem is compounded for offshore turbine installations.

Additionally, wind turbines must be maintained on a regular basis to ensure they remain productive and efficient. Because the rotor, gear sets, transmission, and generator of a typical wind turbine are all located the top of the wind turbine tower, access is limited and maintenance is expensive and often dangerous. The device described herein addresses the high expense of construction and maintenance of existing wind turbines by relocating the generator at or near the bottom of the wind turbine tower. An innovative power transmitting device is used to transfer the rotational energy from the rotor at the top of the tower to the generator at or near the bottom of the tower.

Wind turbines can be of two general designs, direct drive and indirect drive. Direct drive wind turbines have a direct connection between the wind turbine rotor and the generator whereby the generator is rotated at the same speed as the rotor. Indirect drive turbines have a gear set or transmission between the shaft rotated by the rotor and the input shaft of the generator. The gear set can have a fixed or variable gear ratio to control the rotational speed of the rotor and/or the generator.

Additional shortcomings to the prior art can be attributed to the slow speed (~15 rpm) at which the rotor of a wind turbine rotates. In the case of a direct drive wind turbine, the generator must be designed with additional poles to produce a sufficient amount and quality of electrical energy, which substantially increases the weight and cost of the generator. In the case of indirect drive wind turbines, the reliability and serviceability of the gear sets is a cause for concern because they are not easily accessible due to their location in a nacelle, directly behind the rotor, at the top of the wind turbine tower. However, indirect drive wind turbines can have an advantage when placed on floating, off-shore installations due to their smaller generators and lower overall weight.

SUMMARY

The needs set forth herein as well as further and other needs and advantages are addressed by the present embodiments, which illustrate solutions and advantages described below.

There is a need for a device that efficiently transfers energy from the rotor of a wind turbine at the top of a wind turbine tower to a generator that is closer to the ground than current designs. Placing the generator closer to the ground will help reduce costs associated with maintenance and construction of the wind turbine as well as reduce overall weight.

One embodiment of the wind turbine has a tower, the tower having a top end and bottom end. The wind turbine also has a first eccentric mechanism connected to a turbine rotor, the turbine rotor at the top end of the tower. The wind turbine has a second eccentric mechanism connected to an electric generator, the electric generator at the bottom end of the tower and a plurality of tensile links connecting the first and second eccentric mechanisms.

Another embodiment of the wind turbine has a first eccentric mechanism where the first eccentric mechanism is a cam-follower mechanism.

Another embodiment of the wind turbine has a cam-follower mechanism where the cam-follower mechanism has a cam shaft with at least one cam profile, having a plurality of cam lobes driven by the turbine rotor, and a plurality of cam followers each driven by the plurality of cam lobes.

Another embodiment of the wind turbine has a plurality of tensile links where each tensile link of the plurality of tensile links has a first end connected to a cam follower of the plurality of cam followers.

Another embodiment of the wind turbine has cam lobe heads where each cam lobe has at least one cam lobe head and each cam lobe head of the cam shaft is separated by a phase angle offset measured about an axis running parallel to a length of the cam shaft.

Another embodiment of the wind turbine has a phase angle where the phase angle offset is 360/(n*m) degrees, wherein n is equal to the number of tensile links of the plurality of links and m is equal to the number of cam lobes per cam profile.

Another embodiment of the wind turbine has a second eccentric mechanism where the second eccentric mechanism is a swashplate mechanism.

Another embodiment of the wind turbine has a swash plate mechanism where the swashplate mechanism has an output shaft and a plate, the output shaft is connected to a generator, and the plate is connected to the plurality of tensile links.

Another embodiment of the wind turbine has a plate where the plate has connection locations disposed along a perimeter on the plate, the perimeter is disposed around the output shaft, and the plurality of tensile links are connected to connection locations.

Another embodiment of the wind turbine has a perimeter where the perimeter is a circle in the plane of the plate.

Another embodiment of the wind turbine has connection locations where the connection locations are disposed in equal distances from each other along the perimeter.

Another embodiment of the wind turbine has a first eccentric mechanism where the first eccentric mechanism and turbine rotor rotate about a rotational axis, the first eccentric mechanism is connected to the tower via a first yaw mechanism, and the first yaw mechanism allowing the first eccentric mechanism to rotate in relation to the tower and about an axis oblique or perpendicular to the rotational axis of the first eccentric mechanism.

Another embodiment of the wind turbine has a second eccentric mechanism where the second eccentric mechanism is connected to the tower through a second yaw mechanism, and the second yaw mechanism allows the second eccentric mechanism to rotate in relation to the tower and about an axis parallel to the length of the tower.

Another embodiment of the wind turbine has a first yaw mechanism where the first yaw mechanism position is adjusted in response to a change in the position of the second yaw mechanism position or vice versa.

Another embodiment of the wind turbine has a first yaw mechanism where the first yaw mechanism and the second yaw mechanism are one mechanically connected mechanism.

Another embodiment of the wind turbine has tensile links where the tensile links are comprised of carbon fibers.

Another embodiment of the wind turbine has a cam profile where the cam profile has a plurality of lobes.

One embodiment of a wind turbine has a tower having a top end and bottom end; a first eccentric mechanism connected to a turbine rotor, the turbine rotor at the top end of the tower; a second eccentric mechanism connected to an electric generator, the electric generator at the bottom end of the tower; a plurality of tensile links connecting the first and second eccentric mechanisms; a first yaw mechanism; and a second yaw mechanism. The wind turbine has a first eccentric mechanism where the first eccentric mechanism is a cam-follower mechanism and the cam-follower mechanism has a cam shaft with at least one cam profile, with a plurality of cam lobes driven by the turbine rotor, and a plurality of cam followers each driven by the plurality of cam lobes. Each tensile link of the plurality of tensile links has a first end connected to a cam follower of the plurality of cam followers. Each cam lobe has a cam lobe head and each cam lobe head of the cam shaft is separated by a phase angle offset of 360/(n*m) degrees measured about an axis running parallel to a length of the cam shaft, wherein n is equal to the number of tensile links of the plurality of links and m is equal to the number of cam lobe heads per cam profile. The second eccentric mechanism is a swashplate mechanism and the swashplate mechanism has an output shaft and a plate, the output shaft is connected to a generator, and the plate is connected to the plurality of tensile links at connection locations. The plate has connection locations disposed at equal distances along a perimeter on the plate and the perimeter is disposed around the output shaft.

Another embodiment of the wind turbine has a first eccentric mechanism and a turbine rotor where the first eccentric mechanism and the turbine rotor rotate about a rotational axis.

Another embodiment of the wind turbine has a first eccentric mechanism where the first eccentric mechanism is connected to the tower via a first yaw mechanism. The yaw mechanism allows the first eccentric mechanism to rotate in relation to the tower and about an axis oblique or perpendicular to the rotational axis of the first eccentric mechanism. The second eccentric mechanism is connected to the tower through a second yaw mechanism. The second yaw mechanism allows the second eccentric mechanism to rotate in relation to the tower and about an axis parallel to the length of the tower.

DETAILED DESCRIPTION

The present teachings are described more fully hereinafter with reference to the accompanying drawings, in which the present embodiments are shown. The following description is presented for illustrative purposes only and the present teachings should not be limited to these embodiments.

In compliance with the statute, the present teachings have been described in language more or less specific as to structural and mechanical features. It is to be understood, however, that the present teachings are not limited to the specific features shown and described, since the apparatus, systems, and methods herein disclosed comprise preferred forms of putting the present teachings into effect.

For purposes of explanation and not limitation, specific details are set forth such as particular structures, architectures, interfaces, techniques, etc. in order to provide a thorough understanding. In other instances, detailed descriptions of well-known devices and methods are omitted so as not to obscure the description with unnecessary detail.

Generally, all terms used in the claims are to be interpreted according to their ordinary meaning in the technical field, unless explicitly defined otherwise herein. All references to a/an/the element, apparatus, component, means, step, etc. are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second," etc. for different features/components of the present disclosure are only intended to distinguish the features/components from other similar features/components and not to impart any order or hierarchy to the features/components.

To aid the Patent Office and any readers of any patent issued on this application in interpreting the claims appended hereto, Applicant does not intend any of the appended claims or claim elements to invoke 35 U.S.C. 112(f) unless the words "means for" or "step for" are explicitly used in the particular claim.

A notable advantage to the disclosed device is the reduction of overall weight in a wind turbine assembly and the reduction of weight at the top of a wind turbine assembly. This is particularly useful for off-shore, floating wind turbine installations. Further advantages are ease of maintenance of major working components because the disclosed device moves the generator closer to the ground at the bottom of the wind turbine tower. The disclosed device also removes the need to maintain a gear box near the wind turbine rotor because the disclosed device does not require a gear box connected to the wind turbine rotor, although one can be added if desired. A further advantage of the disclosed device is that if a speed change is required, then a gear box can be placed closer to ground level near the generator instead of near the wind turbine rotor. Alternatively, a gear speed increase can be realized with a multi-lobe cam profile incorporated with a minimal weight penalty at the top of the wind turbine tower.

Figure 1:
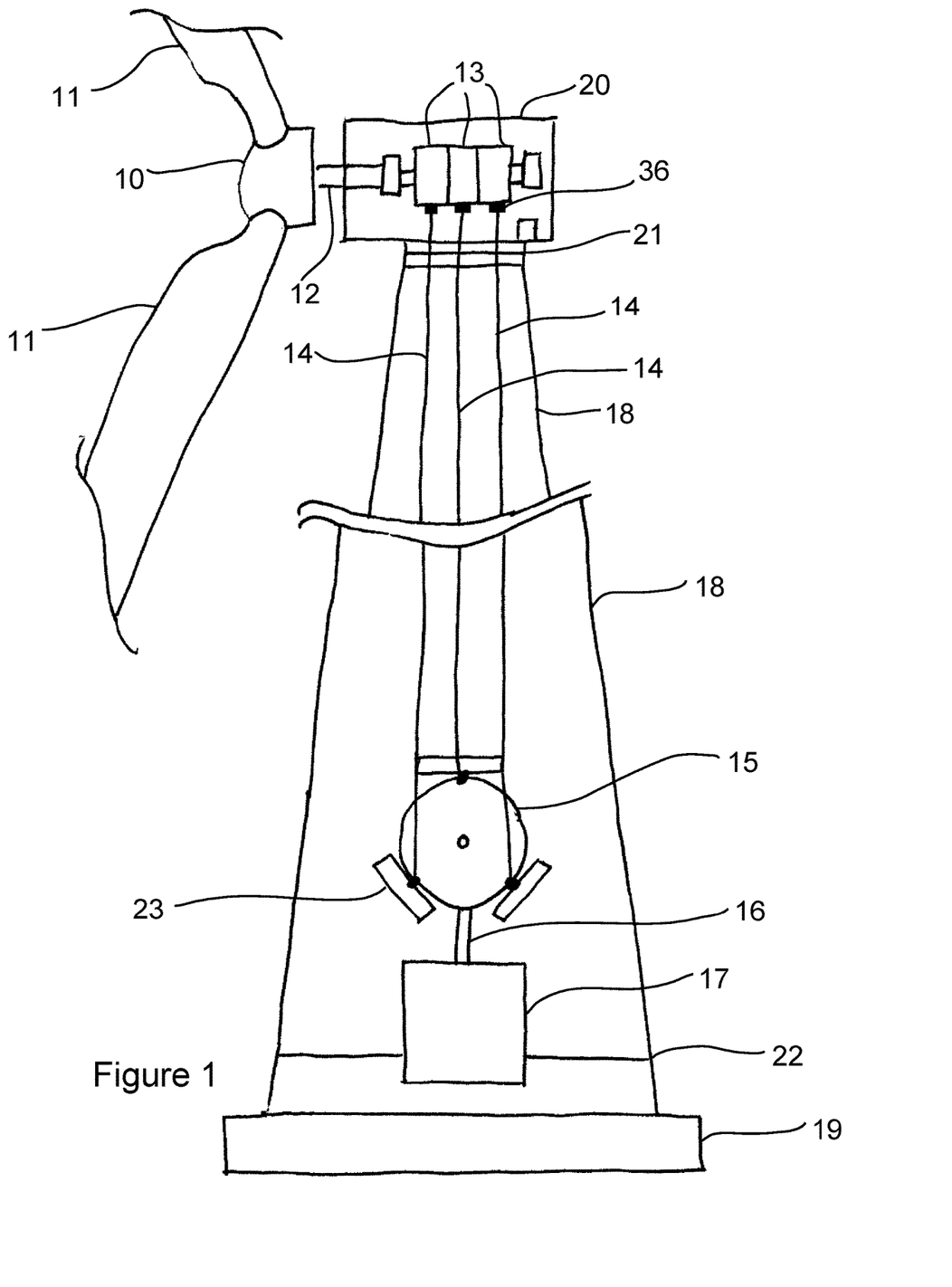
FIG. 1 is an embodiment of a wind turbine where rotational force is transmitted from the rotor at the top of the turbine tower to a generator at the bottom of the turbine tower.

Referring to FIG. 1, a wind turbine 1 system is shown having a wind turbine rotor 10, wind turbine blades 11, a driveshaft 12, cam profiles 13, tension members 14, a swash plate 15, an output shaft 16, generator 17, tower 18, tower base 19, and nacelle 20.

The wind turbine 1 can have two or more turbine blades 11 connected to the rotor 10, about which the turbine blades 11 rotate. The rotor 10 can be connected to a cam profile 13 through a drive shaft 12. The rotor can also be connected to a cam profile 13 such that rotation of the rotor 10 rotates the cam profiles 13.

Although an embodiment of the disclosed wind turbine drive train would have the cam profiles 13 directly driven by the rotor 10, there can be a gearset positioned between the driveshaft 12 and the cam profiles 13 such that the cam profiles 13 rotate faster than the rotor 10. In turn, torque transmitted from the rotor 10 to the cam profiles 13 can be decreased. Torque transmitted to and cam profile 13 shape can be optimized based on the required rotational speed of a generator and the expected or observed rotational speed of the rotor 10.

The cam profiles 13 can act on tension members 14. The lobes of the cam profile 13 can pull the tension members 14 through cam followers 36 to transmit a force from the rotor 10 to the tension members 14. The cam profiles 13 each can have cam followers 36 that follow an eccentric path around the cam profile 13. The cam followers 36 can be connected to the tension members 14 such that the tension members 14 are pulled and released as the cam followers 36 each follow the eccentric path around each cam profile 13. The tension members 14 can be raised and lowered according to the movement of cam followers 36 along cam profiles 13.

The lobes of the cam profile 13 can have a lobe spacing such that tension is applied to each tension member 14 sequentially rather than simultaneously over the course of a rotation of the wind turbine rotor 10. For example, in a case where a wind turbine 1 has three tension members 14, a full rotation of the rotor 10 can be divided into 360 degrees and can result in a tension force being applied to a first member starting at 0 degrees, a tension force being applied to a second tension member 14 starting at 120 degrees, and a tension force being applied to a third tension member 14 starting at 240 degrees. Such an arrangement is a system where each tension member 14 is cyclically tensioned, moved, and released over the course of a rotation of the wind turbine rotor 10. The lobes of each cam profile 13 are situated such that the cyclical tension application to each tension member 14 is out of phase with each other and a smooth application of force to the tension members 14 is achieved.

In the case of more tension members 14, the cam profile 13 quantity and spacing can be adjusted such that tension is applied to each member along individual cycles that are phased equally about a full rotation of the rotor 10. A complete cycle where a tension member 14 is tensioned, then un-tensioned is a tension cycle. Additionally, the tension cycles of the tension members 14 can be phased equally about multiple rotations of the rotor 10. For example, when a gear reduction mechanism is placed between the rotor 10 and the cam profiles 13. In this case, the rotor would spin more than one rotation per a single rotation of the cam profiles 13. Conversely, multiple tension cycles per tension member 14 can be equally phased over one rotation of the rotor 10; this corresponding to a gear ratio increase.

The tension members 14 can be connected to a swash plate mechanism having a swash plate 15 and an output shaft 16. The tension members 14 can be connected to portions of the swash plate 15 such that each tension member 14 acts on a different point of the swash plate 15. The tension members 14 can also be connected to different points on the swash plate 15 along a perimeter around the output shaft 16. For maximum leverage, the tension members 14 can be connected to an outer perimeter or circumference of the swash plate 15.

Figure 3:
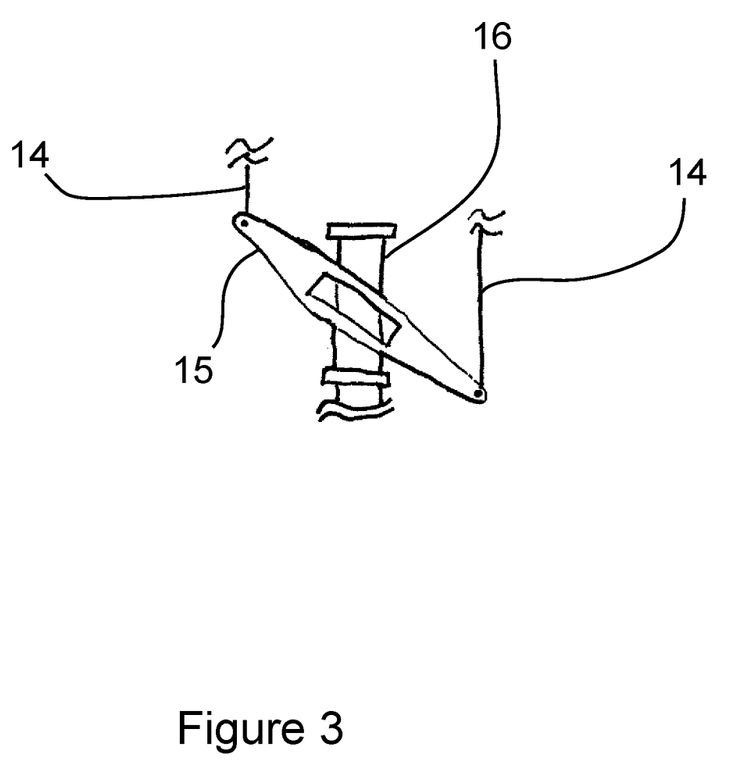
FIG. 3 is an embodiment of a swash plate mechanism on an output shaft.
Figure 4:
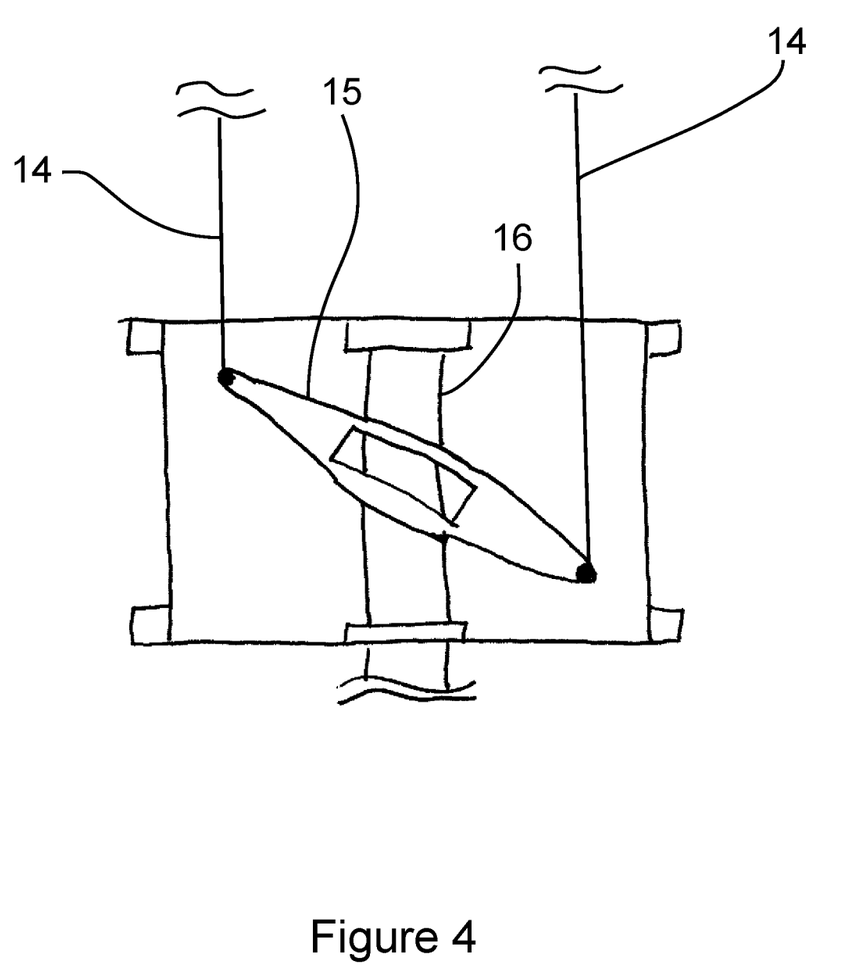
FIG. 4 is an embodiment of a swash plate mechanism on an output shaft.

Referring to FIGS. 1, 3, and 4. The tension members 14 can be tensioned in sequence going around a perimeter surrounding the output shaft 16. For example, a round swash plate 15 can have three tensioning members 14 attached at equally-spaced points around a circumference of the swash plate 15. As the rotor 10 is turned, the cam profiles 13 are situated such that a tension force is applied to a first tensioning element 14, applying a pulling force to the edge of the swash plate 15 in a direction parallel to the output shaft 16. This causes the swash plate 15 to tilt about an axis perpendicular to the longitudinal axis of the output shaft 16 and perpendicular to a line extending from the same longitudinal axis to the connection point of the first tension member 14 to the swash plate 15. An amount of time after a force is applied to the first tensioning member 14, but before the first tensioning member 14 reaches the top of its travel, a force is applied to a second tensioning member. The second tensioning member 14 being adjacent to the first tensioning member 14 along the perimeter in the direction of the rotation of the output shaft 16. The force applied to the first tensioning member 14 is decreased and the second tensioning member 14 is pulled to the top of its travel, tilting the swash plate 15 about an axis perpendicular to the longitudinal axis of the output shaft 16 and perpendicular to a line extending from the longitudinal axis to the connection point of the second tension member 14 to the swash plate 15. This process continues with the third tensioning member 14, and then back to the first tensioning member 14, and so on. This process causes the swash plate to move such that the highest point of the circumference of the swash plate travels around the circumference of the swash plate 15 in a circular oscillation.

The swash plate motion described above can cause the output shaft 16 to rotate. There can be a mechanism between the swash plate 15 and the output shaft 16 that transfers a pulling force on the swash plate 15 to a rotational force on the output shaft 16. The above process of sequentially applying tension to the tensioning members 14 connected to the swash plate 15 can cause the swash plate 15 to move with a cyclical "wobble" whereby when the swash plate 15 is tilted in a direction about the output shaft 16, the output shaft 16 is rotated a fraction of a full rotation. This "wobble" can also be described as a circular oscillation. The device, by continuously changing the direction in which the swash plate 15 is tilted, continuously rotates the output shaft 16.

In order to achieve a rotation of the output shaft 16, the swash plate 15 can be rotationally fixed about the rotational axis of the output shaft 16. This can be achieved by links 23 fixing the swash plate 15 in a rotational direction while allowing the swash plate 15 to tilt in the directions stated above. Examples of securing links 23 include Watt-link mechanisms and Chebyshev-link mechanisms.

The output shaft 16 can be connected to a generator 17. The generator 17 can be mounted at or near the bottom of the wind turbine tower 18. As the swash plate 15 is cyclically tilted as described above, the output shaft 16 can be rotated and transfer rotational force to the generator 17 to produce electricity. The generator 17 can be specified depending on the amount and type of electricity required. Generating capacities can be as small as a few watts up to multiple megawatts, although currently commercial generators are specified to produce electricity in the range of kilowatts to megawatts.

There can be a direct connection between the output shaft 16 and the generator 17 whereby one rotation of the output shaft 16 rotates the generator 17 one rotation. Alternatively, there can be a gear box or transmission device with an increasing gear ratio. The device can either convert one rotation of the output shaft 16 into multiple rotations of the generator with an increasing gear ratio, or the same device can reduce one rotation of the output shaft 16 to less than one rotation of the generator 17 with a reducing gear ratio, although not limited thereto. The transmission or gear box device between the output shaft 16 and the generator 17 can have a variable gear ratio such that the ratio of the rotational speed of the output shaft 16 and the generator 17 can be varied using a control device. The control device can be programed to change the output shaft/generator rotation ratio such that the rotation speed of the generator 17 is maintained within a window. The window can be defined by a minimum generator rotational speed and a maximum generator rotational speed.

The tension members 14 can have a tensioning mechanism such that slack is removed from the tension members 14 when the cam profile 13 and cam follower 36 release the tension member 14. This anti-slack mechanism can be a spring mechanism, screw mechanism, clamp mechanism, hydraulic mechanism, or any other mechanism known in the art for removing slack from a linear tensile element.

A wind turbine must face into the direction the wind is blowing to be most efficient. To accomplish this, wind turbines include a yaw mechanism that allows the nacelle on top of the wind turbine tower to rotate, thereby rotating the wind turbine rotor to face the direction of the wind. The wind turbine 1 can also rotate the nacelle 20 to face the rotor 10 into the wind. However, additional considerations must be made for the drivetrain mechanism at the bottom of the wind turbine tower 18. The wind turbine 1 can have a yaw mechanism 21 between the nacelle 20 and the tower 18 whereby the nacelle 20 can rotate about a longitudinal axis through the tower 18. The yaw mechanism 21 can have a bearing about which the nacelle 20 rotates in relation to the center axis of the tower 18. The yaw mechanism 21 can be driven by a spur gear set, worm gear, linear motors, belt drive, or any other mechanism known in the art for rotating a structure in relation to another. The yaw mechanism 21 can have a brake or other mechanism known in the art for securing the rotational position of a structure in relation to another.

Additionally, the generator 17 can also have a yaw mechanism 22 with which it can rotate simultaneously with the nacelle 20. This yaw mechanism 22 can be of the same structure as the yaw mechanism 21 or separate. The yaw mechanism 22 can be a table or other similar structure upon which the generator 17 is secured. The yaw mechanism 22 can rotate at the same time as or in response to a rotation of yaw mechanism 21 and vice versa. The positioning of the yaw mechanisms 21 and 22 can be calculated and carried out in order to prevent additional or excessive tensioning and/or binding of the swash plate 15, output shaft 16, or tension members 14.

Alternatively, there can be a yaw mechanism 22 built into the swash plate 15 whereby the fixing links 23 and the swash plate can rotate in relation to the output shaft 16. Once the swash plate 15 yaw is repositioned, the yaw mechanism 22 can be secured such that the swash plate 15 can rotate the output shaft 16 without itself rotating. The yaw mechanism 22 can be driven by a spur gear set, worm gear, linear motors, belt drive, or any other mechanism known in the art for rotating a structure in relation to another. The yaw mechanism 22 can have a brake or other mechanism known in the art for securing the rotational position of a structure in relation to another.

The tension members 14 can have a mechanism to dampen vibration induced by wind, geographic movement, operation of the wind turbine 1, or any other condition a wind turbine may be exposed to. Additionally, the tension members 14 can be designed such that they have inherent vibration or oscillation dampening characteristics to prevent destructive resonant frequency activity or persistent vibration. This in turn can prevent premature wear of wind turbine 1 components and failure.

Figure 2A:
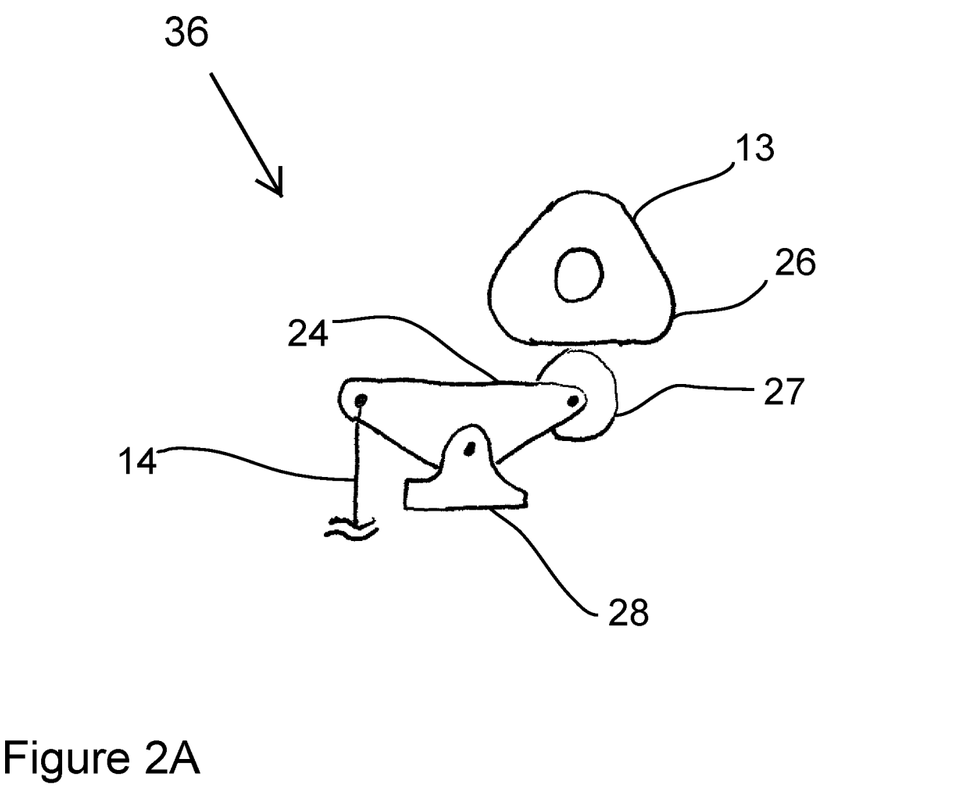
FIG. 2A is an embodiment of a cam follower with a lever arm.

Referring to FIG. 2A, a cam follower mechanism is shown such that the tension member is acted upon by a levered arm 24. The cam profile 13 has three lobe heads 26. In this configuration, a single rotation of the cam profile 13 pulls and releases the tension member 14 three times. Each tensioning of the tension member 14 can correspond to one "wobble" cycle of the swash plate 15, which each can correspond to one rotation of the output shaft 16. This configuration can act as a 3× speed increase instead of a gear box and save weight and cost. Costs are reduced because a cam mechanism would likely require less maintenance and a cam follower mechanism as shown in FIG. 2 would likely contain fewer parts than a gear box would.

The cam follower of FIG. 2A can have a roller 27 that follows the contour of the cam profile 13. As the roller 27 follows the cam profile 13, the levered arm 24 can pivot about a fulcrum 28, thus transmitting a force from the cam profile 13 to the tension member 14. Alternatively, the roller 27 can also be a sliding surface made of self-lubricating material or made of material requiring a lubricating compound.

Figure 2B:
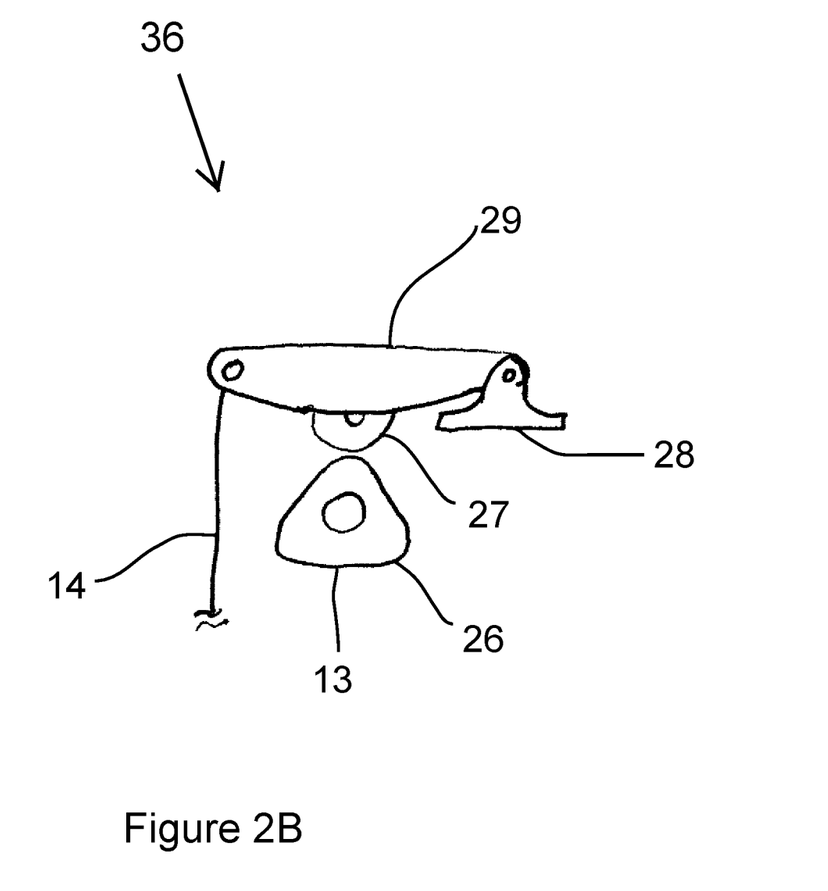
FIG. 2B is an embodiment of a cam follower with a cantilevered arm.

Referring to FIG. 2B, another cam follower is shown with a cantilevered arm 29. This mechanism can have a roller 27 that follows a cam profile 13. When a cam lobe head 26 acts upon the roller 27, the cantilevered arm 29 raises and transmits a force to the tension member 14. The cantilevered arm 29 can, through this motion, move the tension member 14 through an oscillating motion cycle in the direction of the length of the tension member 14. As above, the roller 27 can also be a sliding surface. As above, the number of cam lobes increases the oscillation speed and thus multiplies the rotational speed of the generator without the need for a gear box.

Figure 2C:
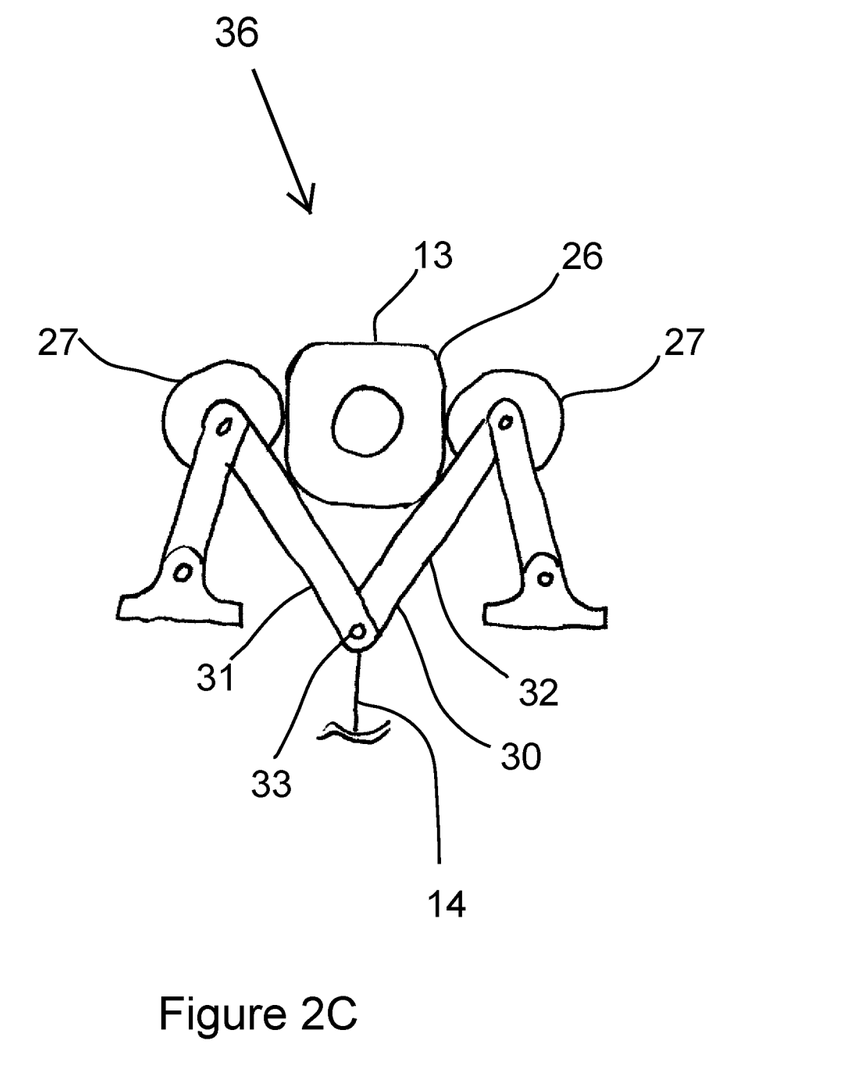
FIG. 2C is an embodiment of a cam follower with dual rollers and linkage.

Referring to FIG. 2C, another cam follower is shown with a plurality of levers forming an actuating linkage 30. The cam profile 13 can rotate between rollers 27, two opposing cam lobe heads 26 simultaneously acting to move the rollers 27 in opposite directions. The motion of the rollers 27 pulls the linkage 31 and 32 such that the attachment point 33 is moved. This movement applies force to the tension member 14, moving it through an oscillating motion cycle in the direction of the length of the tension member 14. As above, the roller 27 can also be a sliding surface. As above, the number of cam lobes increases the oscillation speed and thus multiplies the rotational speed of the generator without the need for a gear box. In this version of the mechanism a speed increase of 4× is realized.

Figure 2D:
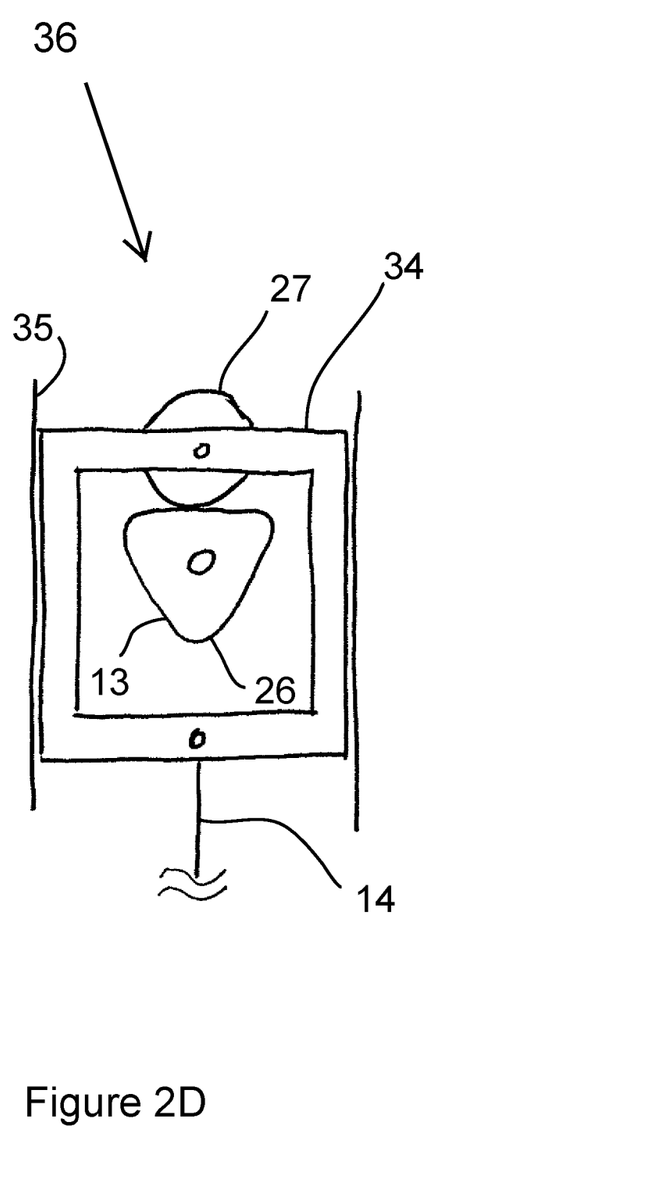
FIG. 2D is an embodiment of a cam follower with a piston-like frame.

Referring to FIG. 2D, another cam follower is shown with a piston-like frame 34 having a roller 27, the frame moving within a channel 35. When the cam lobe head 26 of the cam profile 13 acts on the roller 27, the piston-like frame 34 is moved a distance within the channel 35, thus applying force to a tension member 14. The motion of the piston-like frame 34 moves the tension member 14 through an oscillating motion cycle in the direction of the length of the tension member 14. As above, the roller 27 can also be a sliding surface. As above, the number of cam lobes increases the oscillation speed and thus multiplies the rotational speed of the generator without the need for a gear box.

A practical embodiment of the disclosed apparatus is described below.

A wind turbine 1 can have a rotor 10 with three rotor blades 11. The rotor 10 can be connected to a drive shaft 12 that enters through the front of a nacelle 20. The nacelle 20 contains three cam profiles 13 that are coaxially connected about their rotational axis to the drive shaft 12. Each individual cam profile 13 is part of an individual one of three cam profiles. One rotation of the drive shaft 12 causes the cam profiles 13 to make a full revolution about their rotational axis. The cam profiles 13 are equally separated rotationally about their rotational axis such that the cam lobe heads 26 of each cam profile 13 are separated by 360/(n*m) degrees as measured about the rotation axis of the series of cam profiles 13. "n" is equal to the number of tensile links and "m" is equal to the number of cam lobe heads per cam profile. In this embodiment, the cam profiles 13 are separated rotationally about their rotational axis such that the cam lobe heads 26 are separated by 40 degrees from adjacent cam profiles 13 as measured about the rotation of the series of cam profiles 13. This embodiment realizes a 3× speed multiplication. The nacelle 20 is situated at the top of a wind turbine tower 18.

Also, in the nacelle 20 are three cam followers 36 that follow the contour of the cam profiles 13. Each cam follower 36 is assigned to each individual cam profile 13. The cam followers 36 have a cantilevered arm 29 situated over the cam profiles 13 and have a roller 27. The cantilevered arm 29 is actuated by the rotation of the cam profile 13 whereby when the cam lobe head 26 passes by the roller 27, the cantilevered arm 29 is lifted.

Each cantilevered arm 29 of the cam follower 36 is connected to one tension member 14 at one end, although multiple tension members 14 can be connected to one follower. The tension member resembles a rope, cable, or rod. The tension member is made of carbon nanofiber composite, although other materials such as steel, lightweight metal alloys, composites, fibers, or any other material known in the art of tension member construction could be used.

The three tension members 14 extend down the wind turbine tower 18 and are each connected at their second end to a circular swash plate 15. The three tension members 14 are each connected to a different point on the swash plate 15. Because there are three tension members 14 in this case, each tension member 14 is connected to a point at or near the outer circumference of the swash plate 15. Each of the connection points are equally separated along the outer circumference of the swash plate 15, in this case each separated by an angle of 120 degrees measured around the center of the swash plate 15. The tension member 14 are connected in positions around the circumference of the swash plate 15 such that according to the phase of the cam profiles 13, the tension members 14 are moved axially up and down in a sequential order following the perimeter of the swash plate 15.

The swash plate 15 has an output shaft 16 which is connected to a generator 17. The swash plate 15 is connected to the output shaft 16 with a mechanism that rotates the output shaft 16 when the swash plate 15 is tilted in relation to the rotational axis of the output shaft 16.

With cam profiles 13 equally phased about the rotation of the rotor 10, wind pushes on the blades 11 of the wind turbine 1, spinning the rotor 10. This in turn rotates the driveshaft 12 and the cam profile 13. The cam lobe heads 26 actuate the cam followers 36 which in turn move the tension members 14 axially parallel to their length. Due to the equally phased positions of the cam profiles 13 about the rotation of the rotor 10, the axial motion of the tension members 14 is equally phased in relation to the rotation of the rotor 10.

The equally phased motion of the tension members 14 causes the swash plate 15 to tilt in relation to the rotational axis of the output shaft 16. As the rotor 10 rotates, the tension members 14 are actuated sequentially, rotating the direction of the tilt of the swash plate 15 in a circular direction about the axis of rotation of the output shaft 16. This circular oscillation causes the output shaft to rotate the generator 17 input shaft. The rotation of the generator produces electricity.

The swash plate 15 is secured by links 23 preventing the swash plate 15 itself from rotating about the rotational axis of the output shaft 16.

Both the nacelle 20 and the generator 17 are mounted on yaw mechanisms 21 and 22. Both mechanisms allow their respective structures to rotate in relation to the tower 18 to face into the wind for optimum generating capacity and efficiency.

While the present teachings have been described above in terms of specific embodiments, it is to be understood that they are not limited to these disclosed embodiments. Many modifications and other embodiments will come to mind to those skilled in the art to which this pertains, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings.

What is claimed is:

1. A wind turbine comprising:
   a tower having a top end and a bottom end;
   a first eccentric mechanism connected to a turbine rotor, the turbine rotor being at the top end of the tower;
   a second eccentric mechanism connected to an electric generator, the electric generator being at the bottom end of the tower;
   a plurality of tensile links connecting the first and second eccentric mechanisms.

2. The wind turbine of claim 1, wherein the first eccentric mechanism comprises a cam-follower mechanism.

3. The wind turbine of claim 2, wherein the cam-follower mechanism has a cam shaft with at least one cam profile, a plurality of cam lobes driven by the turbine rotor, and a plurality of cam followers driven by the plurality of cam lobes.

4. The wind turbine of claim 3, wherein each tensile link of the plurality of tensile links has a first end connected to a cam follower of the plurality of cam followers.

5. The wind turbine of claim 3, wherein each cam lobe has at least one cam lobe head and each cam lobe head of the cam shaft is separated by a phase angle offset measured about an axis running parallel to a length of the cam shaft.

6. The wind turbine of claim 5, wherein each cam profile has a plurality of lobe heads.

7. The wind turbine of claim 5, wherein the phase angle offset is 360/(n*m) degrees, wherein n is equal to the number of tensile links of the plurality of links and m is equal to the number of cam lobe heads per cam profile.

8. The wind turbine of claim 1, wherein the second eccentric mechanism comprises a swashplate mechanism.

9. The wind turbine of claim 8, wherein the swashplate mechanism has an output shaft and a plate, the output shaft is connected to the electric generator, and the plate is connected to the plurality of tensile links.

10. The wind turbine of claim 9, wherein:
the plate has connection locations disposed along a perimeter on the plate;
the perimeter is disposed around the output shaft;
and the plurality of tensile links are connected to the connection locations.

11. The wind turbine of claim 10, wherein the perimeter is a circle in a plane of the plate.

12. The wind turbine of claim 10, wherein the connection locations are disposed in equal distances from each other along the perimeter.

13. The wind turbine of claim 1, wherein:
the first eccentric mechanism and turbine rotor rotate about a rotational axis;
the first eccentric mechanism is connected to the tower via a first yaw mechanism, the yaw mechanism allowing the first eccentric mechanism to rotate in relation to the tower and about an axis oblique or perpendicular to the rotational axis of the first eccentric mechanism.

14. The wind turbine of claim 13, wherein the second eccentric mechanism is connected to the tower through a second yaw mechanism, the second yaw mechanism allowing the second eccentric mechanism to rotate in relation to the tower and about an axis parallel to the length of the tower.

15. The wind turbine of claim 14, wherein the first yaw mechanism position is adjusted in response to a change in the position of the second yaw mechanism position or vice versa.

16. The wind turbine of claim 14, wherein the first yaw mechanism and the second yaw mechanism are one mechanically connected mechanism.

17. The wind turbine of claim 1, wherein the tensile links are comprised of carbon fibers.

18. A wind turbine comprising:
a tower having a top end and a bottom end;
a first eccentric mechanism connected to a turbine rotor, the turbine rotor being at the top end of the tower;
a second eccentric mechanism connected to an electric generator, the electric generator being at the bottom end of the tower;
a plurality of tensile links connecting the first and second eccentric mechanisms;
wherein the first eccentric mechanism is a cam-follower mechanism and the cam-follower mechanism has a cam shaft with at least one cam profile, a plurality of cam lobes driven by the turbine rotor, and a plurality of cam followers driven by the plurality of cam lobes;
wherein each tensile link of the plurality of tensile links has a first end connected to a cam follower of the plurality of cam followers;
wherein each cam lobe has a cam lobe head and each cam lobe head of the cam shaft is separated by a phase angle offset of 360/(n*m) degrees measured about an axis running parallel to a length of the cam shaft, wherein n is equal to the number of tensile links of the plurality of links and m is equal to the number of cam lobe heads per cam profile;
wherein the second eccentric mechanism is a swashplate mechanism and the swashplate mechanism has an output shaft and a plate, the output shaft is connected to the electric generator, and the plate is connected to the plurality of tensile links at connection locations;
wherein the plate has the connection locations disposed at equal distances along a perimeter on the plate and the perimeter is disposed around the output shaft.

19. The wind turbine of claim 18, further comprising a first yaw mechanism and a second yaw mechanism;
wherein the first eccentric mechanism and the turbine rotor rotate about a rotational axis.

20. The wind turbine of claim 19, wherein the first eccentric mechanism is connected to the tower via the first yaw mechanism, the yaw mechanism allowing the first eccentric mechanism to rotate in relation to the tower and about an axis oblique or perpendicular to the rotational axis of the first eccentric mechanism;
wherein the second eccentric mechanism is connected to the tower through the second yaw mechanism, the second yaw mechanism allowing the second eccentric mechanism to rotate in relation to the tower and about an axis parallel to the length of the tower.

* * * * *